United States Patent [19]

Ullinger

[11] 4,266,422
[45] May 12, 1981

[54] OVERSPEED DEVICE TEST DISCONNECT DEVICE

[76] Inventor: Richard L. Ullinger, 407 Jeffris Ave., Beach Haven, N.J. 08008

[21] Appl. No.: 131,228

[22] Filed: Mar. 17, 1980

[51] Int. Cl.³ .............................................. G01P 21/00
[52] U.S. Cl. .......................................... 73/2; 340/515
[58] Field of Search ...................... 73/2, 548; 340/514, 340/515, 671; 318/461, 465, 462, 463, 464

[56] References Cited
U.S. PATENT DOCUMENTS

| | | | |
|---|---|---|---|
| 1,622,100 | 3/1927 | Flanders | 73/548 |
| 1,782,914 | 11/1930 | Townsend | 73/2 |
| 2,552,542 | 5/1951 | Duerr, Jr. | 73/2 |
| 3,363,446 | 1/1968 | Kaley | 73/2 |
| 3,508,443 | 4/1970 | Nutter | 73/548 |

Primary Examiner—S. Clement Swisher

[57] ABSTRACT

A device for testing, or exercising, or calibrating an emergency governor by disconnecting the overspeed device from the equipment it protects, and driving the overspeed device throughout the entire speed range by using an auxiliary drive.

1 Claim, 1 Drawing Figure

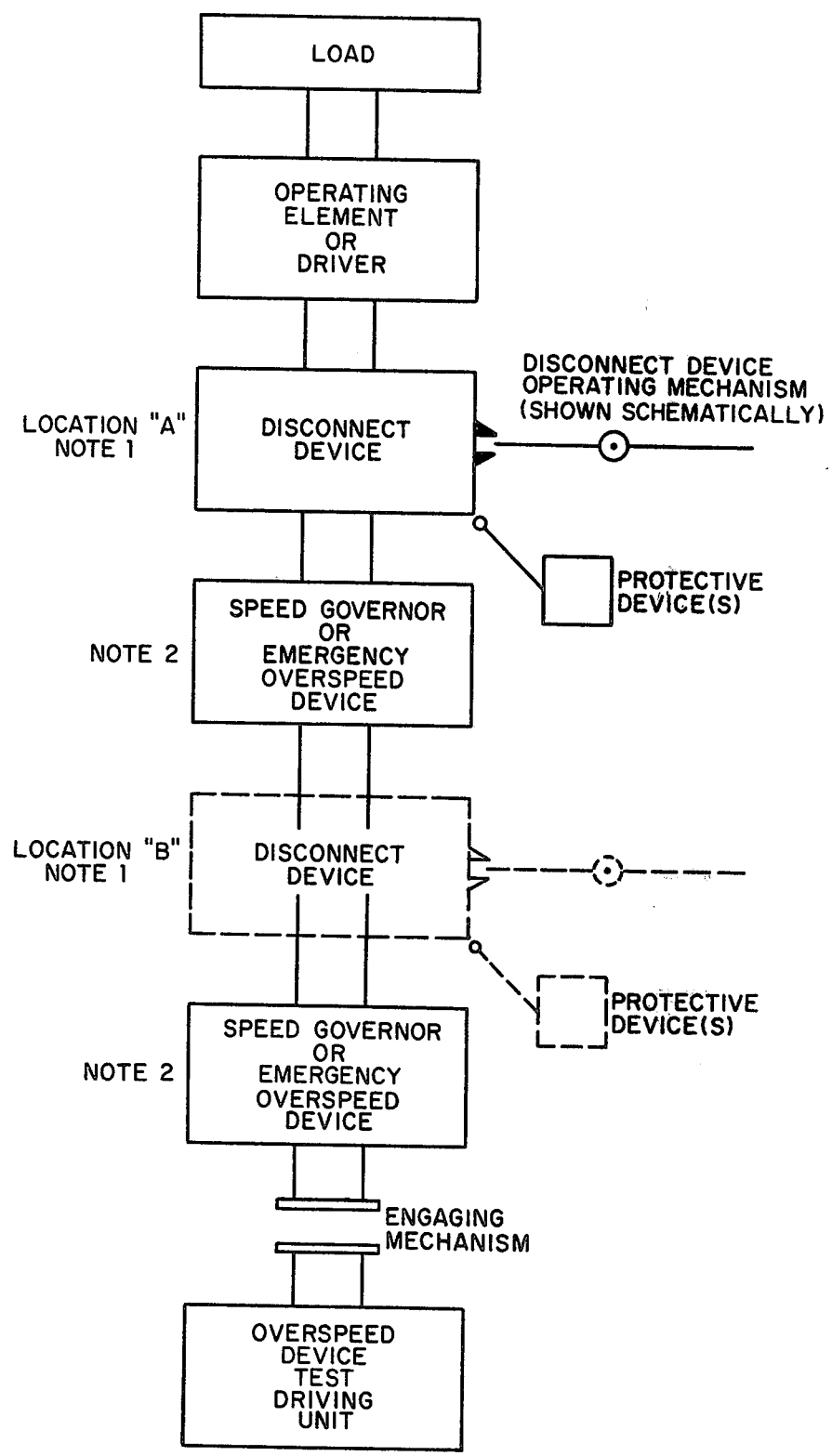

OVERSPEED DEVICE TEST DISCONNECT DEVICE

BACKGROUND OF THE INVENTION

Prime movers, such as steam turbines, as well as other equipment, are generally protected from excessive speeds, by utilizing an emergency overspeed device to safely shut the unit down. Since such occurrences are very infrequent other devices are utilized to exercise the overspeed trip device to assure its operability at all times. Devices such as U.S. Pat. No. 3,508,443, Nutter are utilized to exercise the emergency gov. from standstill throughout the speed range. Still others use a fluid stream that is injected into the overspeed trip device, causing an unbalance, and hence a trip operation. The fluid stream method depends on rotational unbalance and cannot operate at very low speeds (U.S. Pat. 1,666,490, Dryer).

All of these devices have a common serious shortcoming, i.e., they lack the ability to produce a tripping action that serves as a calibration device. Therefore all emergency governors are tested for their set point only by operating the massive equipment throughout the speed range, until the set point is reached and the unit trips.

This invention permits disconnnecting the emergency trip device from the unit, protect the unit from accidental start-up by using protective interlocks, testing and calibrating the emergency trip device, without operating the massive prime mover and related equipment.

BRIEF DESCRIPTION OF DRAWING

The drawing, in block diagram form, depicts a load, the prime mover or driver, with a disconnect device inserted between the prime mover and the speed governor, and/or the emergency overspeed device. It also shows the auxiliary drive and protective devices.

DESCRIPTION OF THE DRAWING

The drawing, in block diagram form, depicts a load, which may be an electrical generator, pump, compressor or other driven equipment. It indicates that the load is driven by some prime mover, similar to a steam turbine, and that the prime mover is protected from overspeed by an emergency overspeed device, and that its speed is generally controlled by an operating governor. It further shows a disconnect test device that permits separation of the emergency overspeed device and/or the operating governor, when the unit is at standstill, from the prime mover. Upon separation, the prime mover is interlocked by protective devices, prohibiting operation of the prime mover. The auxiliary drive is then coupled to the disconnected portion of the shaft, permitting the operation of the governor portion solely. Upon reaching the trip speed setting, the auxiliary drive is removed and the disconnect device restores the prime mover and governor to its operating position. The interlocks are also in the operating mode, permitting start-up of the prime mover. The emergency overspeed device and/or the speed governor may be at either location shown and the disconnect device may be at either location A or B.

1. In an installation of rotational equipment having a speed responsive device normally connected thereto the improvement comprising: a disconnect device for interrupting the connection between the rotational equipment and the speed responsive device in a test mode, a protective device responsive to the disconnect device for rendering the rotational equipment inoperative in the test mode, the speed responsive device further having a means for engagement by a driving device for driving the speed responsive device at a known speed in the test mode.

* * * * *